(12) United States Patent
Powell et al.

(10) Patent No.: US 12,450,597 B2
(45) Date of Patent: Oct. 21, 2025

(54) DATA PROTECTION WITH TRANSLATION

(71) Applicant: Visa International Service Association, San Francisco, CA (US)

(72) Inventors: Glenn Powell, Fremont, CA (US); John Sheets, San Francisco, CA (US); Paul Tait, San Mateo, CA (US); Kim Wagner, Sunnyvale, CA (US); Krishna Koganti, Cupertino, CA (US); Marc Perl, Cameron Park, CA (US); Hector Rodriguez, Daly City, CA (US); Susan Zloth, Castle Pines, CO (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 549 days.

(21) Appl. No.: 17/665,127

(22) Filed: Feb. 4, 2022

(65) Prior Publication Data

US 2022/0156732 A1 May 19, 2022

Related U.S. Application Data

(63) Continuation of application No. 16/171,905, filed on Oct. 26, 2018, now Pat. No. 11,276,058, which is a (Continued)

(51) Int. Cl.
*G06Q 20/38* (2012.01)
*G06F 21/60* (2013.01)
(Continued)

(52) U.S. Cl.
CPC ....... *G06Q 20/3823* (2013.01); *G06F 21/606* (2013.01); *G06Q 20/4012* (2013.01);
(Continued)

(58) Field of Classification Search
CPC .......... G06Q 20/3823; G06Q 20/4012; G06F 21/606; G07F 7/1091; H04L 9/0866;
(Continued)

(56) References Cited

U.S. PATENT DOCUMENTS 4,423,287 A 12/1983 Zeidler
5,228,084 A 7/1993 Johnson
(Continued)

FOREIGN PATENT DOCUMENTS

CN 1675632 A 9/2005
CN 101647220 A 2/2010
(Continued)

OTHER PUBLICATIONS

Office Action. mailed Mar. 2, 2023, for EP Patent Application No. EP20192277.0, 6 pages.
(Continued)

*Primary Examiner* — John W Hayes
*Assistant Examiner* — Edgar R. Martinez-Hernandez
(74) *Attorney, Agent, or Firm* — Kilpatrick Townsend & Stockton LLP

(57) ABSTRACT

Systems and methods are disclosed in which data associated with a transaction are protected with encryption. At an access device, a PIN associated with a payment account may be encrypted with a first key derived from an initial key of the access device and sensitive data associated with the payment account may be encrypted with a second key derived from the initial key. At a secure module associated with a host server encrypted sensitive data of an authorization request message may be decrypted. The secure module associated with the host server can re-encrypt the sensitive data using a zone encryption key associated with a payment processing network. A translated authorization request message including the re-encrypted sensitive data can be trans-
(Continued)

mitted by the merchant server to the payment processing network.

12 Claims, 9 Drawing Sheets

Related U.S. Application Data continuation of application No. 13/735,800, filed on Jan. 7, 2013, now Pat. No. 10,147,089.

(60) Provisional application No. 61/704,428, filed on Sep. 21, 2012, provisional application No. 61/607,546, filed on Mar. 6, 2012, provisional application No. 61/583,550, filed on Jan. 5, 2012.

(51) Int. Cl.
*G06Q 20/40* (2012.01)
*G07F 7/10* (2006.01)
*H04L 9/08* (2006.01)
*H04L 9/14* (2006.01)
*H04L 9/32* (2006.01)
*H04L 9/40* (2022.01)

(52) U.S. Cl.
CPC .......... *G07F 7/1091* (2013.01); *H04L 9/0866* (2013.01); *H04L 9/0894* (2013.01); *H04L 9/14* (2013.01); *H04L 9/3226* (2013.01); *H04L 63/06* (2013.01); *H04L 2209/56* (2013.01); *H04L 2463/061* (2013.01); *H04L 2463/102* (2013.01)

(58) Field of Classification Search
CPC ....... H04L 9/0894; H04L 9/14; H04L 9/3226; H04L 63/06; H04L 2209/56; H04L 2463/061; H04L 2463/102
See application file for complete search history.

(56) References Cited

U.S. PATENT DOCUMENTS

| | | | |
|---|---|---|---|
| 5,613,012 | A | 3/1997 | Hoffman |
| 5,671,279 | A | 9/1997 | Elgamal |
| 5,745,576 | A | 4/1998 | Abraham et al. |
| 5,781,438 | A | 7/1998 | Lee |
| 5,850,446 | A | 12/1998 | Berger et al. |
| 5,883,810 | A | 3/1999 | Franklin |
| 5,931,917 | A | 8/1999 | Nguyen et al. |
| 5,953,710 | A | 9/1999 | Fleming |
| 5,956,699 | A | 9/1999 | Wong |
| 5,978,840 | A | 11/1999 | Nguyen et al. |
| 5,987,132 | A | 11/1999 | Rowney |
| 5,987,140 | A | 11/1999 | Rowney et al. |
| 6,000,832 | A | 12/1999 | Franklin |
| 6,014,635 | A | 1/2000 | Harris |
| 6,044,360 | A | 3/2000 | Picciallo |
| 6,061,665 | A | 5/2000 | Bahreman |
| 6,098,053 | A | 8/2000 | Slater |
| 6,119,105 | A | 9/2000 | Williams |
| 6,128,391 | A | 10/2000 | Denno et al. |
| 6,163,771 | A | 12/2000 | Walker |
| 6,175,922 | B1 | 1/2001 | Wang |
| 6,227,447 | B1 | 5/2001 | Campisano |
| 6,236,981 | B1 | 5/2001 | Hill |
| 6,253,027 | B1 | 6/2001 | Weber et al. |
| 6,267,292 | B1 | 7/2001 | Walker |
| 6,282,656 | B1 | 8/2001 | Wang |
| 6,304,915 | B1 | 10/2001 | Nguyen et al. |
| 6,327,578 | B1 | 12/2001 | Linehan |
| 6,341,724 | B2 | 1/2002 | Campisano |
| 6,366,682 | B1 * | 4/2002 | Hoffman ............ G06Q 20/4097 382/115 |
| 6,373,950 | B1 | 4/2002 | Rowney |
| 6,385,596 | B1 | 5/2002 | Wiser |
| 6,422,462 | B1 | 7/2002 | Cohen |
| 6,425,523 | B1 | 7/2002 | Shem Ur |
| 6,592,044 | B1 | 7/2003 | Wong |
| 6,594,759 | B1 | 7/2003 | Wang |
| 6,636,833 | B1 | 10/2003 | Flitcroft |
| 6,748,367 | B1 | 6/2004 | Lee |
| 6,805,287 | B2 | 10/2004 | Bishop |
| 6,850,916 | B1 | 2/2005 | Wang |
| 6,879,965 | B2 | 4/2005 | Fung |
| 6,891,953 | B1 | 5/2005 | DeMello |
| 6,901,387 | B2 | 5/2005 | Wells |
| 6,931,382 | B2 | 8/2005 | Laage |
| 6,938,019 | B1 | 8/2005 | Uzo |
| 6,941,285 | B2 | 9/2005 | Sarcanin |
| 6,947,908 | B1 | 9/2005 | Slater |
| 6,980,670 | B1 | 12/2005 | Hoffman |
| 6,990,470 | B2 | 1/2006 | Hogan |
| 6,990,471 | B1 * | 1/2006 | Rajaram ................ G06Q 30/06 380/42 |
| 6,991,157 | B2 | 1/2006 | Bishop |
| 7,051,001 | B1 | 5/2006 | Slater |
| 7,051,929 | B2 | 5/2006 | Li |
| 7,069,249 | B2 | 6/2006 | Stolfo |
| 7,103,576 | B2 | 9/2006 | Mann, III |
| 7,107,246 | B2 | 9/2006 | Wang |
| 7,113,930 | B2 | 9/2006 | Eccles |
| 7,136,835 | B1 | 11/2006 | Flitcroft |
| 7,136,840 | B2 | 11/2006 | Pinkas et al. |
| 7,177,835 | B1 | 2/2007 | Walker |
| 7,177,848 | B2 | 2/2007 | Hogan |
| 7,194,437 | B1 | 3/2007 | Britto |
| 7,195,154 | B2 | 3/2007 | Routhenstein |
| 7,209,561 | B1 | 4/2007 | Shankar et al. |
| 7,233,920 | B1 | 6/2007 | Rodriguez, Jr. |
| 7,237,255 | B2 | 6/2007 | Fransdonk |
| 7,264,154 | B2 | 9/2007 | Harris |
| 7,287,692 | B1 | 10/2007 | Patel |
| 7,292,999 | B2 | 11/2007 | Hobson |
| 7,350,230 | B2 | 3/2008 | Forrest |
| 7,353,382 | B2 * | 4/2008 | Labrou ................ G06Q 20/02 705/78 |
| 7,376,629 | B1 | 5/2008 | McIsaac et al. |
| 7,379,919 | B2 | 5/2008 | Hogan |
| 7,382,637 | B1 | 6/2008 | Rathnavelu |
| RE40,444 | E | 7/2008 | Linehan |
| 7,415,443 | B2 | 8/2008 | Hobson |
| 7,433,845 | B1 | 10/2008 | Flitcroft |
| 7,444,676 | B1 | 10/2008 | Asghari-Kamrani |
| 7,469,151 | B2 | 12/2008 | Khan |
| 7,490,069 | B2 | 2/2009 | Camenisch |
| 7,548,621 | B1 * | 6/2009 | Smith ................. H04L 9/0625 713/194 |
| 7,548,889 | B2 | 6/2009 | Bhambri |
| 7,562,041 | B2 | 7/2009 | Chehade et al. |
| 7,567,934 | B2 | 7/2009 | Flitcroft |
| 7,567,936 | B1 | 7/2009 | Peckover |
| 7,571,139 | B1 | 8/2009 | Giordano |
| 7,571,142 | B1 | 8/2009 | Flitcroft |
| 7,580,898 | B2 | 8/2009 | Brown |
| 7,584,153 | B2 | 9/2009 | Brown |
| 7,593,896 | B1 | 9/2009 | Flitcroft |
| 7,606,560 | B2 | 10/2009 | Labrou |
| 7,627,531 | B2 | 12/2009 | Breck |
| 7,627,895 | B2 | 12/2009 | Gifford |
| 7,635,084 | B2 | 12/2009 | Wang et al. |
| 7,650,314 | B1 | 1/2010 | Saunders |
| 7,685,037 | B2 | 3/2010 | Reiners |
| 7,702,578 | B2 | 4/2010 | Fung |
| 7,702,916 | B2 * | 4/2010 | Seaton, Jr. ............ H04L 63/083 705/72 |
| 7,707,120 | B2 | 4/2010 | Dominguez |
| 7,712,655 | B2 | 5/2010 | Wong |
| 7,734,527 | B2 | 6/2010 | Uzo |
| 7,753,265 | B2 | 7/2010 | Harris |
| 7,764,792 | B1 * | 7/2010 | Avivi ................... H04L 9/0894 380/255 |
| 7,770,789 | B2 | 8/2010 | Oder, II |

(56) References Cited

U.S. PATENT DOCUMENTS

| | | |
|---|---|---|
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,827,114 B2 | 11/2010 | Pinkas et al. |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,016,189 B2 | 9/2011 | Wang et al. |
| 8,025,223 B2 | 9/2011 | Saunders |
| 8,046,256 B2 | 10/2011 | Chien |
| 8,046,305 B1 | 10/2011 | Barnett |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,145,569 B2 | 3/2012 | Gong |
| 8,171,525 B1 | 5/2012 | Pelly |
| 8,175,973 B2 | 5/2012 | Davis et al. |
| 8,185,478 B2 | 5/2012 | Pinkas et al. |
| 8,190,523 B2 | 5/2012 | Patterson |
| 8,190,530 B2 | 5/2012 | Redmond et al. |
| 8,195,565 B2 | 6/2012 | Bishop |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,089 B2 | 7/2012 | Wang et al. |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,433,116 B2 | 4/2013 | Butler et al. |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,737,623 B2 * | 5/2014 | Hart .................. G06Q 20/3829 713/172 |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 * | 6/2015 | Sheets ................ G06Q 20/4016 |
| 9,100,826 B2 | 8/2015 | Weiss |
| 9,123,042 B2 * | 9/2015 | von Mueller ....... G06Q 20/3823 |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 11,276,058 B2 | 3/2022 | Powell et al. |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0123972 A1 | 9/2002 | Hodgson et al. |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |

(56) References Cited

U.S. PATENT DOCUMENTS

| | | |
|---|---|---|
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0182921 A1* | 9/2004 | Dickson ............... G07F 7/1008 235/380 |
| 2004/0210449 A1 | 10/2004 | Breck |
| 2004/0210498 A1 | 10/2004 | Freund |
| 2004/0210759 A1 | 10/2004 | Fitch |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0049256 A1* | 3/2006 | von Mueller ...... G06Q 20/3552 705/64 |
| 2006/0235795 A1 | 10/2006 | Johnson |
| 2006/0237528 A1 | 10/2006 | Bishop |
| 2006/0278704 A1 | 12/2006 | Saunders |
| 2007/0094085 A1 | 4/2007 | Redmond et al. |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0165625 A1 | 7/2007 | Eisner et al. |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2007/0299781 A1 | 12/2007 | Rodriguez, Jr. |
| 2008/0015988 A1 | 1/2008 | Brown |
| 2008/0029593 A1* | 2/2008 | Hammad ............... G06Q 20/20 235/380 |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0189214 A1* | 8/2008 | Mueller ................. G06Q 20/20 705/72 |
| 2008/0195551 A1 | 8/2008 | McIsaac et al. |
| 2008/0201264 A1 | 8/2008 | Brown |
| 2008/0201265 A1 | 8/2008 | Hewton |
| 2008/0208759 A1 | 8/2008 | Royyuru |
| 2008/0222046 A1 | 9/2008 | McIsaac et al. |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0030845 A1* | 1/2009 | Hurry ..................... H04L 9/12 705/50 |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0055323 A1 | 2/2009 | Rebidue et al. |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0154696 A1 | 6/2009 | Robertson et al. |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0049658 A1 | 2/2010 | Sanchez et al. |
| 2010/0057621 A1* | 3/2010 | Faith .................. G06Q 20/3829 705/71 |
| 2010/0088227 A1 | 4/2010 | Belamant et al. |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0161494 A1* | 6/2010 | Slater ..................... G06Q 20/40 705/72 |
| 2010/0179909 A1* | 7/2010 | Dana ................... G06Q 20/3674 705/50 |
| 2010/0185545 A1 | 7/2010 | Royyuru |
| 2010/0211505 A1 | 8/2010 | Saunders |
| 2010/0217999 A1 | 8/2010 | Seaton, Jr. et al. |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0281366 A1* | 11/2010 | Langmacher .......... G11B 27/34 715/716 |
| 2010/0291904 A1 | 11/2010 | Musfeldt |
| 2010/0293099 A1* | 11/2010 | Pauker ............... G06Q 20/3674 705/67 |
| 2010/0299267 A1 | 11/2010 | Faith et al. |
| 2010/0306076 A1 | 12/2010 | Taveau |
| 2010/0318468 A1* | 12/2010 | Carr ....................... G06Q 20/40 705/79 |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0137802 A1 | 6/2011 | Spies et al. |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178925 A1 | 7/2011 | Lindelsee et al. |
| 2011/0178926 A1 | 7/2011 | Lindelsee et al. |
| 2011/0191244 A1 | 8/2011 | Dai |
| 2011/0211689 A1* | 9/2011 | von Mueller ...... G06Q 20/3823 380/28 |
| 2011/0238511 A1 | 9/2011 | Park |
| 2011/0238573 A1 | 9/2011 | Varadarajan |
| 2011/0238580 A1* | 9/2011 | Coppinger ............ H04L 67/306 705/65 |
| 2011/0246315 A1 | 10/2011 | Spies |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |

(56) References Cited

U.S. PATENT DOCUMENTS

| | | |
|---|---|---|
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0014376 A1 | 1/2012 | Shore et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0039469 A1* | 2/2012 | Mueller ............... G06Q 20/204 380/252 |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0089835 A1 | 4/2012 | Peckover |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0130903 A1 | 5/2012 | Dorsey |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0166343 A1 | 6/2012 | Carapelli et al. |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1* | 6/2013 | Shablygin ............... H04L 9/40 713/155 |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1* | 8/2013 | Powell ............... H04L 9/0894 705/76 |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1* | 9/2013 | von Mueller ...... G06Q 20/3829 705/71 |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |

(56) References Cited

U.S. PATENT DOCUMENTS

| | | |
|---|---|---|
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1* | 10/2014 | Weber ............... G06Q 20/3829 705/71 |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1* | 1/2015 | Sheets ............... G06Q 20/322 705/71 |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1* | 2/2015 | Karpenko ............ G06Q 20/3227 705/71 |
| 2015/0088756 A1* | 3/2015 | Makhotin ............ G06Q 20/401 705/71 |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0339664 A1 | 11/2015 | Wong et al. |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1* | 3/2016 | Le Saint ............. H04L 9/0891 713/155 |
| 2016/0092696 A1 | 3/2016 | Guglani et al. |
| 2016/0092872 A1* | 3/2016 | Prakash ............... G06Q 20/322 705/65 |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0224976 A1 | 8/2016 | Basu |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | | | |
|---|---|---|---|---|
| EP | 2156397 A1 | 2/2010 | | |
| KR | 10-2003-0074853 A1 | 9/2003 | | |
| WO | 1997049054 A2 | 6/1997 | | |
| WO | 1997049069 A2 | 6/1997 | | |
| WO | 1997041539 A1 | 11/1997 | | |
| WO | 1997049053 A2 | 12/1997 | | |
| WO | 1997049055 A1 | 12/1997 | | |
| WO | 1998005011 A2 | 2/1998 | | |
| WO | 1998013796 A2 | 4/1998 | | |
| WO | 1998013797 A2 | 4/1998 | | |
| WO | 1998025371 A1 | 6/1998 | | |
| WO | 2000022559 | 4/2000 | | |
| WO | 2000052866 A2 | 9/2000 | | |
| WO | 2001001316 A2 | 1/2001 | | |
| WO | WO-0124560 A1 * | 4/2001 | ............ | H04W 12/04 |
| WO | 2001035304 | 5/2001 | | |
| WO | 2001069388 | 9/2001 | | |
| WO | 2001075744 A1 | 10/2001 | | |
| WO | 2002063580 A2 | 8/2002 | | |
| WO | 2002069291 A2 | 9/2002 | | |
| WO | 2003065178 A2 | 8/2003 | | |
| WO | 2004042536 A2 | 5/2004 | | |
| WO | 2004091170 A2 | 10/2004 | | |
| WO | 2006113834 A2 | 10/2006 | | |
| WO | 2008021581 A2 | 2/2008 | | |
| WO | 2008059465 A2 | 5/2008 | | |
| WO | 2008095198 | 8/2008 | | |
| WO | 2008150801 A1 | 12/2008 | | |
| WO | 2009018683 A1 | 2/2009 | | |
| WO | 2009032523 A1 | 3/2009 | | |
| WO | 2009061788 A1 | 5/2009 | | |
| WO | 2010002858 A2 | 1/2010 | | |
| WO | 2010074962 A2 | 7/2010 | | |
| WO | 2010078522 A1 | 7/2010 | | |
| WO | 2010141501 A2 | 12/2010 | | |
| WO | 2012068078 A2 | 5/2012 | | |
| WO | WO-2012064378 A1 * | 5/2012 | ............ | G06F 21/44 |
| WO | 2012074820 A1 | 6/2012 | | |
| WO | 2012088135 A1 | 6/2012 | | |
| WO | 2012098556 A1 | 7/2012 | | |
| WO | 2012142370 A2 | 10/2012 | | |
| WO | 2012167941 A1 | 12/2012 | | |
| WO | 2013048538 A1 | 4/2013 | | |
| WO | 2013056104 A1 | 4/2013 | | |
| WO | 2013119914 A1 | 8/2013 | | |
| WO | 2013179271 A2 | 12/2013 | | |

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request Via Access Device filed Nov. 25, 2015.

(56) References Cited

OTHER PUBLICATIONS

Prakash et al., U.S. Appl. No. 14/955,716 (unpublished), Provisioning Platform for Machine-To-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., , U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
International Search Report and Written Opinion mailed Jun. 12, 2013 in PCT/2013/020580, 16 pages.
Extended European Search Report dated May 6, 2015 for EP Patent Application No. 13733792.9, 5 pages.
Examination Report dated Oct. 7, 2015 for Singapore Patent Application No. 11201403861X, 12 pages.
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.
Office Action mailed on Sep. 13, 2016 for Chinese Application No. 201380008011.8, 28 pages.
Extended European Search Report mailed on Dec. 22, 2020 for European Application No. 20192277.0, 8 pages.
Bin et al., "Data Security Analysis of the Mass Producing Process of Smart Cards", IEE Computer Society, International Conference on E-Business and E-Government, 2010, pp. 1316-1319.
Lennon et al. "Personal Verification and Message Authentication Using Personal Keys", An IP.com, Prior Art Database Technical Disclosure, Electronic Publication Date Feb. 9, 2005, 6 pages.

\* cited by examiner

| Symbol | Description | Character code / No. of characters |
|---|---|---|
| STX | Start sentinel | % |
| FC | Format code | B |
| PAN | Primary Account Number | up to 19 digits |
| FS | Separator | ^ |
| NM | Name | 2 to 26 characters |
| FS | Separator | ^ |
| ED | Expiration date | four digits or ^ |
| SC | Service code | three digits or ^ |
| DD | Discretionary data | balance of characters |
| ETX | End sentinel | ? |
| LRC | Longitudinal redundancy check (see ISO/IEC 7811-2) | 1 character |
|  | Maximum record length | 79 alphanumeric characters |

*FIG. 5*

| Symbol | Description | Character code / No. of characters |
|---|---|---|
| STX | Start sentinel | ; |
| PAN | Primary Account Number | up to 19 digits |
| FS | Separator | = |
| ED | Expiration date | four digits or = |
| SC | Service code | three digits or = |
| DD | Discretionary data | balance of available digits |
| ETX | End sentinel | ? |
| LRC | Longitudinal redundancy check (see ISO/IEC 7811-2) | 1 digit |
|  | Maximum record length | 40 numeric digits |

FIG. 6

DATA PROTECTION WITH TRANSLATION

CROSS-REFERENCES TO RELATED APPLICATIONS

The present application is a continuation of U.S. patent application Ser. No. 16/171,905, filed Oct. 26, 2018, which is a continuation of U.S. patent application Ser. No. 13/735,800, filed on Jan. 7, 2013, which claims priority to U.S. Provisional App. No. 61/583,550, filed on Jan. 5, 2012, U.S. Provisional App. No. 61/607,546, filed on Mar. 6, 2012, and U.S. Provisional App. No. 61/704,428, filed on Sep. 21, 2012, the entire contents of all of which are herein incorporated by reference for all purposes.

BACKGROUND OF THE INVENTION

Financial account data can be protected from unauthorized access through measures such as encryption of data within devices having hardware-based security controls. However, existing security measures, such as encrypting a personal identification number (PIN), may leave sensitive data, such as a primary account number (PAN) exposed. Existing solutions for protecting sensitive data may require application of key management schemes that differ from those used to encrypt PIN data, increasing the burden to merchants of providing security for financial data.

Merchants may protect financial account data by routing all transactions to a single destination for payment processing. However, when routing an authorization request for a transaction, a merchant may be able to select a payment processing network among multiple available payment processing networks. It may be necessary for the merchant to provide for decryption of information in the authorization request message and re-encryption of information based on the routing destination of the authorization request message. Some payment processing networks may lack an encryption solution for sensitive data. A merchant may wish to utilize the encryption measures provided by a first payment processing network while continuing to have the ability to route authorization requests to alternative payment processing networks.

Embodiments described herein solve these and other problems.

BRIEF SUMMARY OF THE INVENTION

Techniques are provided for protecting sensitive data when an authorization request for a transaction is routed in an environment comprising a plurality of payment processing network options.

In one embodiment, a method is described. The method includes encrypting a personal identification number (PIN) by an access device. The PIN encryption uses a first encryption key variant based on an initial key. The access device encrypts sensitive data using a second encryption key variant based on the initial key. An authorization request message including the encrypted PIN and encrypted sensitive data are transmitted to a host server.

In another embodiment, a method includes receiving an authorization request message at a host server. A secure module communicatively connected to the host server decrypts the encrypted sensitive data. The secure module re-encrypts the decrypted sensitive data with a first sensitive data zone encryption key associated with the first payment processing network. A first translated authorization request message including the re-encrypted sensitive data is transmitted by the host server to the first payment processing network. In a further embodiment, the authorization request message received at the host server includes a PIN. The secure module decrypts the encrypted PIN and re-encrypts the decrypted PIN with a first PIN zone encryption key associated with the first payment processing network. The first translated authorization request message includes the re-encrypted PIN. In an additional embodiment, the secure module is configured to transmit a second translated authorization request message to a second payment processing network. A second PIN zone encryption key is used for re-encryption of a PIN for the second translated authorization request message and a second sensitive data zone encryption key is used for re-encryption of sensitive data for the second authorization request message.

Another embodiment of the technology is directed to a system. The system includes a processor and a computer readable medium coupled to the processor. The computer readable medium comprises code executable by the processor for implementing a method comprising encrypting a personal identification number (PIN) by an access device. The PIN encryption uses a first encryption key variant based on an initial key. The access device encrypts sensitive data using a second encryption key variant based on the initial key. An authorization request message including the encrypted PIN and encrypted sensitive data are transmitted to a host server.

A further embodiment of the technology is directed to a system. The system includes a processor and a computer readable medium coupled to the processor. The computer readable medium comprises code executable by the processor for implementing a method comprising receiving an authorization request message at a host server. The authorization request message includes encrypted sensitive data. A secure module communicatively connected to the host server decrypts the encrypted sensitive data. The secure module re-encrypts the decrypted sensitive data with a first sensitive data zone encryption key associated with the first payment processing network. A first translated authorization request message including the re-encrypted sensitive data is transmitted by the host server to the first payment processing network.

In a further embodiment, a method includes receiving data associated with a personal account identifier (PAI). An access device can encrypt the PAI. The encrypted PAI can have the same format as the PAI. The encrypted PAI is written to a field of an authorization request message. The field of the authorization request message is a field that is designated to receive a PAI. An authorization request message data element is used as a signal to identify the presence of the encrypted PAI in the authorization request message. The access device transmits the authorization request message.

These and other embodiments are described in further detail below.

BRIEF DESCRIPTION OF THE DRAWINGS

FIG. 5 is a table showing an illustrative specification for the structure and content of track one of a payment device.

FIG. 6 is a table showing an illustrative specification for the structure and content of track two of a payment device.

DETAILED DESCRIPTION OF THE INVENTION

Figure 1:
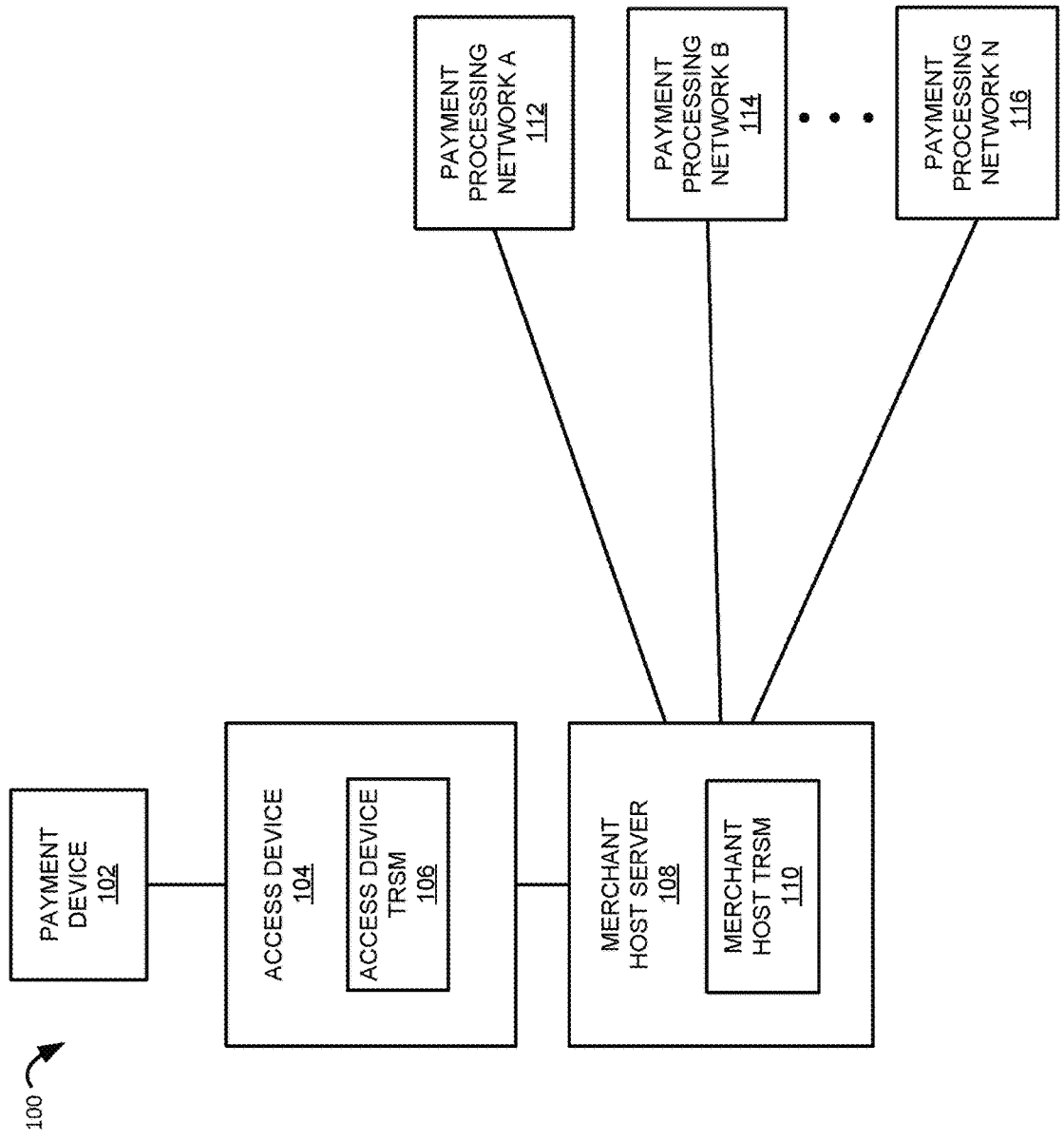
FIG. 1 shows an exemplary system in which embodiments of the technology can be implemented.

Embodiments disclosed herein are directed to techniques for protecting financial data in an authorization request message. Terms used to describe embodiments herein can be understood with reference to the descriptions provided below.

An "authorization request message" can be a request to authorize a transaction. The authorization request message can be sent to an issuer of a payment account to request authorization of a transaction performed with the payment account.

A merchant may generate the authorization request message. The authorization request message may be transmitted to the issuer via an acquirer.

The authorization request message may have a defined format to facilitate requests and responses between points in a financial network. For example, an authorization request message may be a standardized interchange message such as a message that complies with International Organization for Standardisation (ISO) 8583, which is a standard for systems that exchange electronic transactions. An ISO 8583 message can include a message type indicator, one or more bitmaps indicating which data elements are present in the message, and data elements of the message. The data included in the authorization request message may include data obtained from a payment device as well as other data related to the transaction, the payment account holder, and the merchant. For example, the authorization request message can include a personal identification number (PIN), and sensitive data such as a primary account number (PAN), cardholder name, and discretionary data. Additionally, the authorization request message can include payment device expiration date, currency code, transaction amount, a merchant transaction stamp, acceptor city, acceptor state/country, routing transit number, terminal identification, network identification, etc. An authorization request message may be protected using encryption in order to prevent data from being compromised.

The authorization request message may include a payment account identifier. The payment account identifier may be associated with a portable consumer device, such as a credit card or debit card. For example, a payment account identifier may be a primary account number (PAN). The PAN may be a unique payment card number, such as a credit card account number associated with a credit card or a debit account number associated with a debit account. The PAN may identify the issuer as well as the cardholder account. Where the term PAN is employed herein, it will be understood that any payment account identifier could be used.

A personal identification number (PIN) can be a numeric password shared between a user and a system and used to authenticate the user to the system. A PIN block can be an encrypted block of data used to encapsulate a PIN. The PIN block may be composed of the PIN, the PIN length, and a subset of the PAN.

Issuer discretionary data (IDD), also referred to as "discretionary data," can be data residing in Track 1 and/or Track 2 of a magnetic strip or a chip of a payment device or otherwise associated with a payment account. The IDD may be variable in length and may contain customer and/or card verification data such as a PIN offset value, PIN verification value (PVV), card verification value (CVV), etc. The IDD may also include other data defined by card brands and/or issuers, such as information used in a loyalty program, fleet data, etc.

An "acquirer" is typically a business entity (e.g., a commercial bank) that has a business relationship with a particular merchant. For example, the acquirer may deposit funds into a merchant bank account and recoup those funds from issuers.

An "issuer" is typically a business entity (e.g., a bank or credit union) which issues a payment device to an account owner and provides administrative and management functions for the payment account. Some entities may perform both issuer and acquirer functions. A payment account may be any account usable in a transaction, such as a credit, debit or prepaid account.

A "payment device" may refer to a device used to initiate a transaction, such as a portable consumer device or a portable communication device. The payment device may interface with an access device such as a point of sale device to initiate the transaction. Typically, a portable consumer device is hand-held and compact so that it can fit into a consumer's wallet or pocket (e.g., pocket sized). Specific examples of portable consumer devices include payment cards such as smartcards, debit devices (e.g., a debit card), credit devices (e.g., a credit card), or stored value devices (e.g., a stored value card or "prepaid" card). A portable communication device, also referred to as a "mobile device," may be, for example, a cellular or wireless telephone (e.g., a smartphone), personal digital assistant (PDA), portable computer (e.g., tablet or laptop computer), pager, or other portable device carried by the payment account holder.

An "access device" may refer to a device that receives information from a payment device to initiate a transaction. For example, an access device may be a point of sale device configured to read account data encoded in a magnetic stripe or chip of a card-format portable consumer device. Other examples of access devices include cellular phones, PDAs, personal computers, server computers, tablets, handheld specialized readers, set-top boxes, electronic cash registers, automated teller machines (ATMs), virtual cash registers, kiosks, security systems, access systems, and the like. Access devices may use means such as radio frequency (RF) and magnetic stripe readers to interact with a payment device. The access device may be a device located at a merchant's physical location or may be a virtual point of sale such as a web-site that is part of an eCommerce (electronic commerce) transaction. In an eCommerce transaction, the account owner may enter payment account data into a portable communication device, personal computer, or other device capable of communicating with a merchant computer. In other card not present transactions, such as mail-order or telephone-order transactions, information may be entered into a merchant computer serving as an access device. In a further example, communication may occur between a contactless element of a portable communication device and an access device, such as a merchant device reader or point of sale terminal, by using a wireless communications mechanism, such as near field communications (NFC), RF, infra-red, optical communications, etc.

A "payment processing network" may include a system that receives an authorization request message. The payment processing network may obtain information from the authorization request message to use in determining whether to approve a transaction associated with the authorization request message. The payment processing network may send an authorization response message to the merchant indicating whether a transaction is approved. In some embodiments, the payment processing network may perform a settlement process, which can involve posting the transactions to the accounts associated with the payment devices used for the transactions and calculating the net debit or credit position of each user of the payment devices. A payment processing network may be operated by an acquirer and/or an issuer.

A "host" may be one or more systems, such as a server, responsible for performing merchant transaction processing, routing decision and/or capture. The host may be resident at a merchant, gateway, processor or other entity. In some embodiments, a host may be associated with a merchant direct exchange (MDEX), value added reseller (VAR), or other connectivity model. Where the term "merchant host server" is used herein, it will be recognized that any server, such as a payment processor server, could be used.

A "tamper-resistant security module" (TRSM) is a device that incorporates physical protections to prevent compromise of cryptographic security parameters contained by the device. TRSMs are available with varying levels of protection. A TRSM that is tamper-resistant may employ physical measures such as hardened casing to make intrusion into the device difficult. A tamper-evident TRSM may have hardware features to make intrusion attempts evident to subsequent viewers, such as a seal that would be broken during intrusion into the device. A tamper-responsive TRSM may be configured to detect an intrusion attempt and destroy sensitive information, such as cryptographic security parameters, should an intrusion attempt occur.

A "hardware security module" (HSM) is a TRSM with a secure cryptoprocessor that can manage digital keys, accelerate cryptoprocesses and/or provide strong authentication for accessing critical keys for server applications. An HSM may provide both logical and physical protection of sensitive information from non-authorized access. The HSM may be a physical device in the form of a plug-in card or external security device. The HSM may be communicatively coupled to a host.

Payment card industry data security standards (PCI DSS) are a set of requirements applicable to entities involved with transaction processing. The purpose of the requirements is to maintain the security of financial data.

Derived Unique Key Per Transaction (DUKPT) is a key management scheme that can derive a unique transaction key for each transaction. DUKPT uses a base derivation key (BDK) that is typically known only to the party that initializes a TRSM and recipient of a message encrypted by the TRSM. The TRSM is typically injected with an initial key that is derived from the BDK. A transaction key may be derived from the initial key. If a derived key is compromised, future and past transaction data remain protected because the next or prior keys cannot be easily determined from the derived key. DUKPT can be used for the encryption of data associated with electronic commerce transactions, such as a PIN and/or sensitive data.

For example, a PIN pad may include a TRSM injected with a unique initial key and a key serial number. The PIN pad may generate a unique key for each transaction. An authorization request message generated by the PIN pad may include an encrypted PIN block and the key serial number. The authorization request message may be transmitted from the PIN pad to a merchant host server having its own TRSM. The merchant host server TRSM can use a key serial number (KSN) to retrieve the base derivation key (BDK) used in the generation of the unique initial PIN pad key. The TRSM can use the BDK and the KSN to decrypt the encrypted data.

Triple Data Encryption Algorithm (IDEA), also referred to as "Triple Data Encryption Standard", "3DES," "Triple DES" and "TDES," is a block cipher that applies the Data Encryption Standard (DES) cipher algorithm three times to each block of data being encrypted.

A "Zone Encryption Key" (ZEK) can indicate one or more keys used to encrypt data between two specific points (e.g., between a host and a payment processing network). Separate ZEKs may be used for PIN and for sensitive data. In a preferred embodiment, ZEKs are used only for sensitive data encryption between parties, and is preferably not the same as PIN, MAC or other specific encryption keys A "server" can include one or more computers. Multiple computers of a server may be communicatively coupled via network connections, such as wired, wireless, and/or Internet network connections. One or more of the computers of a server may store databases.

Encryption and Zone Translation of PIN and Sensitive Data

When a payment device is used for a transaction, an authorization request message may be generated for the transaction. The authorization request message may include a personal identification number (PIN) and sensitive data such as a primary account number (PAN), cardholder name, cardholder address, issuer discretionary data, or other sensitive data. Sensitive data may be data that is stored with a payment device, such as in the magnetic stripe or in a chip of the payment device. Alternatively, storage data may be data provided by a user to an access device, such as cardholder address information provided by a user in the course of an e-commerce or other card not present transaction. The PIN and sensitive data may be encrypted by an access device that receives information from the payment device. The PIN and sensitive data may be encrypted using encryption key variants based on an initial key injected into the access device.

FIG. 1 shows an exemplary system 100 in which embodiments of the technology can be implemented. System 100 includes one or more server computers, data processing subsystems and networks that can be used to initiate an authorization request message for a transaction and route the authorization request message to an entity capable of approving the transaction. Where only one of each component is shown, it is understood that embodiments of the technology may include more than one of each component. In addition, some embodiments of the technology may include fewer than all of the components shown in FIG. 1. Also, the components in FIG. 1 may communicate via any suitable communication medium (including the internet), using any suitable communication protocol.

In a typical transaction, a payment device 102 interfaces with an access device 104 to initiate a transaction. Access device 104 may include access device tamper resistant security module (TRSM) 106. Access device TRSM 106 may be physically and/or communicatively coupled to (or may be an integral component of) access device 104. Access information can receive information associated with payment device 102, including sensitive data, when payment device 102 interfaces with access device 104. In some embodiments, access device 104 receives sensitive data and/or a PIN from a device storing account information, such as a portable communication device.

In an illustrative example, payment device 102 may be a credit card and access device 104 may be a PIN pad housed in a TRSM. The PIN pad may have a user interface for receiving numerical input indicating PIN passwords and a magnetic stripe reader for obtaining track data from the magnetic stripe of a payment device.

In other embodiments, payment device information may be user input that is received by access device 104. PIN data may be received from payment device 102 or from user input received by access device 106.

When access device 104 receives data such as PIN and payment device information, TRSM 106 may encrypt the data. In some cases, it may be necessary to obtain a PAN prior to encrypting the PIN. Sensitive data such as PAN, cardholder name, cardholder address, and discretionary data may be determined from the information received from payment device 102. The sensitive data may be parsed from track data obtained by access device 104 from payment device 102. In some embodiments, access device 106 encrypts the PIN by generating a PIN block based on the PIN, PIN length, and a subset of the PAN. Access device 104 may encrypt sensitive data including one or more of PAN, cardholder name, cardholder address, discretionary data, and any other information to be treated as sensitive data.

Access device TRSM 106 may store an initial key used for encrypting data. For each transaction, one or more transaction keys may be derived from the initial key. It may be necessary for different transaction keys to be applied to PIN and sensitive data for compliance with regulations such as PCI DSS. The PIN may be encrypted using a first transaction key derived from the initial key and sensitive data may be encrypted using a second transaction key derived from the initial key. In this manner, both the PIN and the sensitive data can be encrypted using the same key management scheme (such as DUKPT) and the same encryption algorithm (such as TDEA).

An authorization request message including encrypted PIN data and encrypted sensitive data may be generated by access device 104 and transmitted to merchant host server 108. The authorization request message may include designated fields for various types of data. When encryption is applied to data in an authorization request message, the encryption may change parameters (such as data type, data length, etc.) of a field associated with the encrypted data. Due to the changed parameters, the encrypted data may be placed in a new field. For example, an authorization request message may include a field sized to accommodate a PAN. When the encryption is applied, the PAN and other sensitive data may be placed in one or more alternative fields of the authorization request message. A field may be added to an authorization request message to signal that the encrypted PAN is located in an encrypted PAN field. Sensitive data such as a PAN, a cardholder name, and discretionary data may be encrypted at access device 104 and placed in individual elements within a field of an authorization request message, such as field 53 of an ISO formatted authorization request message.

In some embodiments, format preserving encryption is applied to sensitive data in the authorization request message. For example, when format preserving encryption is used, a subset of the digits of the PAN may be replaced with encrypted values while particular digits of the PAN remain unchanged. In a preferred embodiment, the first six digits and the last four digits of the PAN remain unchanged and the middle digits are replaced with encrypted values. In this manner, the authorization request message can be handled by payment processing networks that are not configured to handle authorization request messages having alternative fields for storing encrypted data. To signal the presence of encrypted data within the PAN field of the authorization request message, an altered expiration date may be included in the expiration date field of the authorization request message. For example, the authorization request message may contain an expiration date that is 40 years after the expiration date associated with the payment device used for a transaction.

Merchant host server 108 may include merchant host TRSM 110. Merchant host TRSM 110 may be communicatively and/or physically coupled to or an integral component of merchant host server 108. In some embodiments, merchant host TRSM 110 may be located remotely from the premises of merchant server 108. In order to route transactions to multiple payment processing networks, a merchant may need to have a merchant host TRSM 110 to translate encrypted data in the authorization request message. For example, it may be necessary to translate keys at a merchant host TRSM 110 for compliance with PCI DSS standards limiting the exposure of keys associated with access device TRSM 106. When merchant host server 108 is configured to route authorization request messages to multiple payment processing networks 112-116, merchant host server 108 may translate encrypted data into a Zone Encryption Key (ZEK) associated with a particular payment processing network. Merchant host server 108 may determine how to route an authorization request message based on information contained in the authorization request message. For example, the first six digits of a PAN field containing a PAN encrypted according to a format preserving encryption method may be used by merchant host server 108 to determine how to route the authorization request message.

Translation by merchant host TRSM 110 can include decryption of PIN and sensitive data in the authorization request message received from access device 104 and re-encryption of the PIN and sensitive data using one or more Zone Encryption Keys (ZEK). A ZEK may be associated with a particular payment processing network. The ZEK is typically a shared key between a payment processing network and merchant host server 108. It may be necessary to apply different ZEKs to PIN and to sensitive data, e.g., for compliance with PCI DSS. The translation may be performed by Merchant Host TRSM 110 such that decrypted PIN and sensitive data are never exposed to merchant host server 108. Merchant host server 108 may transmit an authorization request message including the translated PIN and sensitive data to the one of payment processing networks 112-116 to which the authorization request message is to be routed.

In some embodiments, merchant host server 108 may route an authorization request message to a payment processing network that is not configured to handle encrypted data. In such embodiments, encrypted sensitive data may be decrypted and an authorization request message including the decrypted sensitive data may be transmitted from merchant host server 108 to the payment processing network.

The payment processing network that receives the authorization request message may decrypt the PAN or other sensitive data and may also verify the PIN. The payment processing network may determine whether the transaction is authorized. In some cases, the authorization request message can be transmitted to an issuer server which may determine whether the transaction is authorized. An authorization response message indicating whether the transaction was authorized may be routed back to merchant host server 108 from the issuer and/or payment processing network that received the authorization request message. The authorization response may be displayed by the access device 104, printed on a receipt, or otherwise conveyed to the payment account holder.

It will be understood that a server associated with a payment processing network or other entity and associated TRSM can be used in lieu of merchant host server 108 and merchant host TRSM 110.

A clearing and settlement process is typically conducted by each of the payment processing networks at a fixed time. The fixed time may vary from one network to another. A clearing process is a process of exchanging financial details between an acquirer and an issuer to facilitate posting to the payment account holders account and reconciliation of the consumer's settlement position.

Within a TRSM, data may be encrypted and/or decrypted using DUKPT and TDES. It will be recognized that other key management systems (such as master/session and fixed key) and/or other encryption algorithms (such as RSA, DEA, ECIES, AES, or other encryption algorithms) could be applied.

Figure 2:
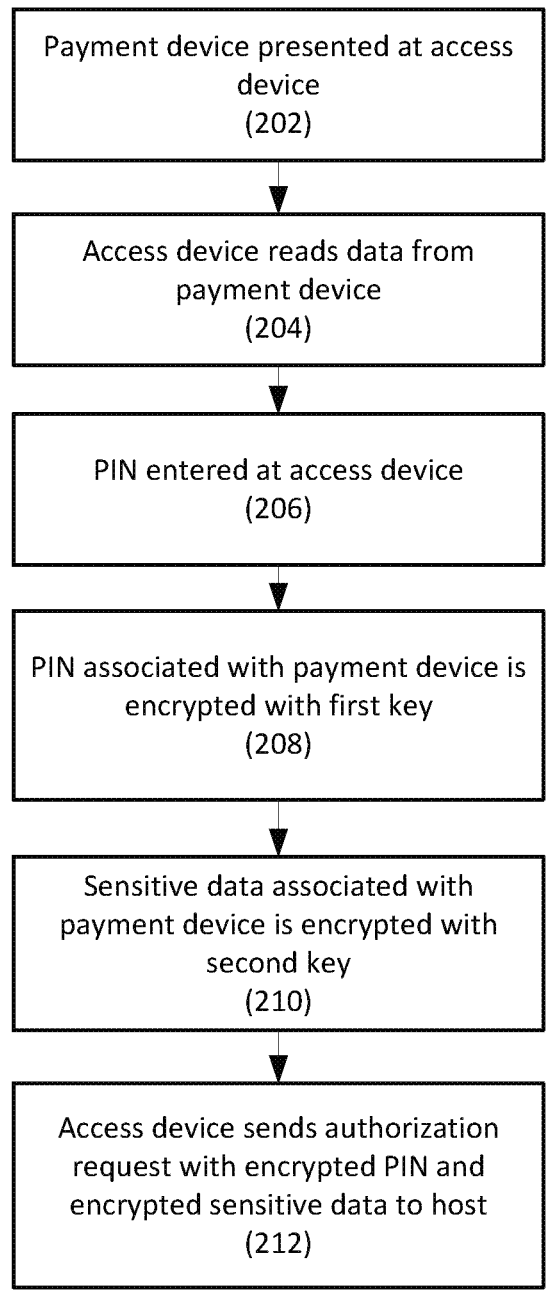
FIG. 2 is an illustrative flowchart for encryption of PIN and sensitive data at the access device and merchant host.

FIG. 2 is an illustrative flowchart for encryption of PIN and sensitive data at the access device and merchant host. At operation 202, the cardholder can present a payment device 102 at access device 104. At operation 204, access device 104 can read data from payment device 102, such as track data stored in the magnetic stripe of the payment device. The data read from payment device 102 can include sensitive data, such as a PAN, cardholder name, and discretionary data. At operation 206, access device 104 can receive a PIN, such as a PIN entered at a user interface of access device 104.

At operation 208, access device 104 can encrypt the PIN using a first key. The first key may be a first transaction specific key derived from a key injected into access device 104. At operation 210, access device 104 can encrypt sensitive data using a second key. Sensitive data may include one or more of a PAN, cardholder name, discretionary data, cardholder address, and any other sensitive data received by access device 104. The second key may be a second transaction specific key derived from a key injected into access device 104. At operation 212, access device 104 can generate an authorization request message including the encrypted PIN and encrypted sensitive data and transmit the authorization request message to a host server, such as merchant host server 108.

In some embodiments, an host device may receive an authorization request message including encrypted sensitive data from an access device. The authorization request may or may not include an encrypted PIN. For example, an access device may receive sensitive data from a credit card or other payment device for a transaction that does not require a PIN number. In such embodiments, a host device may translate sensitive data.

Figure 3:
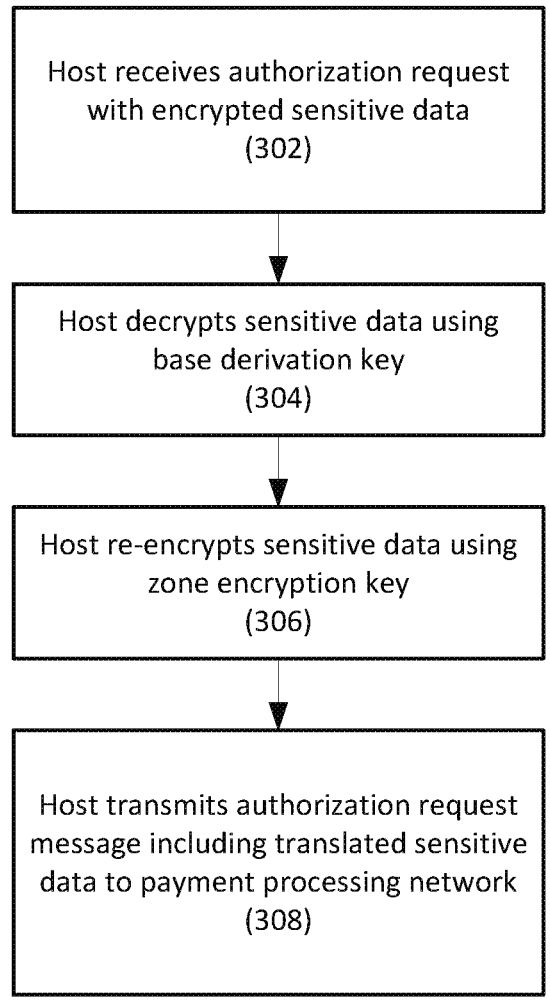
FIG. 3 is an illustrative flowchart for translation of sensitive data at the host.

FIG. 3 is an illustrative flowchart for translation of sensitive data at the host. At operation 302, a host such as merchant host server 108 receives an authorization request message including encrypted sensitive data from access device 104. The host may parse the sensitive data from the authorization request message. At operation 304, the host may decrypt sensitive data using information derived from a base derivation key. To translate the sensitive data, the host may decrypt the sensitive data using the information derived from the base derivation key associated with access device 104, as indicated at operation 304, and re-encrypt the sensitive data using a zone encryption key, as indicated at operation 306. At operation 308, the host may transmit an authorization request message to the payment processing network.

In some embodiments, a host may receive an authorization request message including an encrypted PIN and encrypted sensitive data. The host may translate the PIN and the sensitive data.

Figure 4:
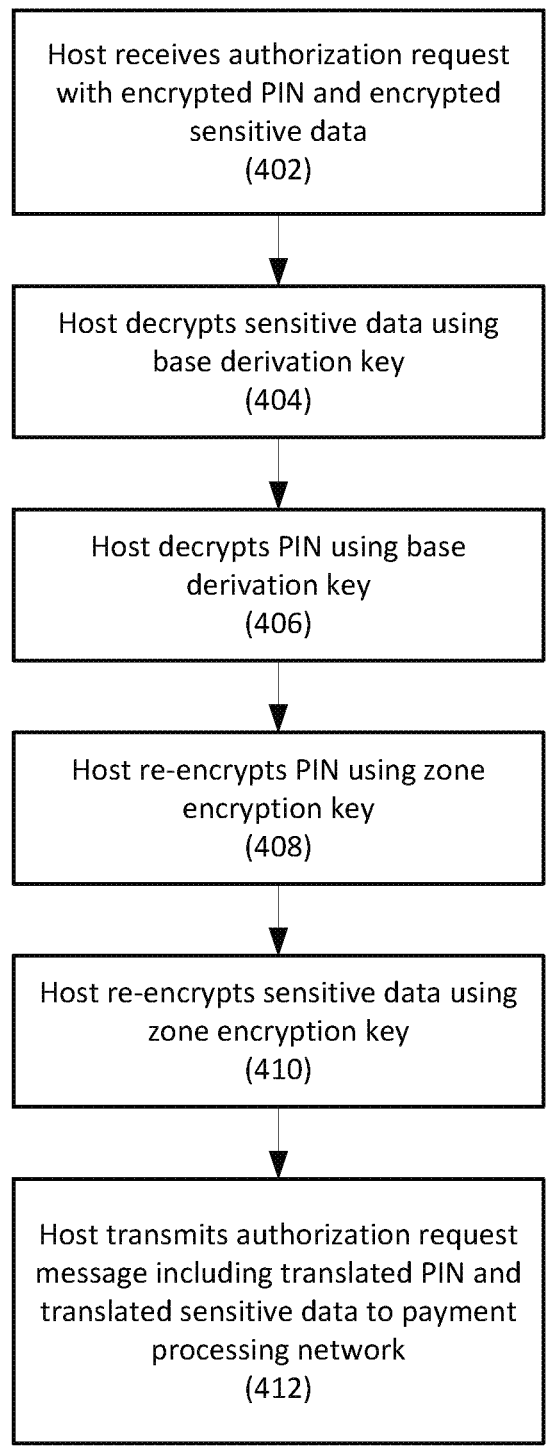
FIG. 4 is an illustrative flowchart for translation of PIN and sensitive data at the host.

FIG. 4 is an illustrative flowchart for translation of PIN and sensitive data at the host. At operation 402, a host such as merchant host server 108 receives an authorization request message including an encrypted PIN and encrypted sensitive data from access device 104. Decrypted sensitive data such as a decrypted PAN may be needed for decryption of the PIN. The host may parse the sensitive data from the authorization request message. At operation 404, the host may decrypt sensitive data using information derived from a base derivation key. The host may parse the PIN from the authorization request message. At operation 406, the host may decrypt the PIN using the information derived from the base derivation key, and, in some cases, also using the decrypted PAN. To translate the PIN, the host may re-encrypt the PIN using a zone encryption key, as indicated at operation 408. In some embodiments, the PIN is re-encrypted using the zone encryption key and the decrypted PAN. To translate the sensitive data, the host may re-encrypt the sensitive data using a zone encryption key, as indicated at operation 410.

In some embodiments, separate zone encryption keys may be used to encrypt the PIN and the sensitive data. For example, a PIN-specific zone encryption key may be used or generated for use in encrypting PIN numbers, and a sensitive-data-specific zone encryption key may be used or generated for use in encrypting sensitive data. Furthermore, each payment processing network 112-116 may use one or more zone encryption keys that are specific to the particular payment processing network. Thus, a first PIN-specific zone encryption key and a first sensitive-data-specific zone encryption key can be used for translation when an authorization request message will be routed to a first payment processing network 112, and a second PIN-specific zone encryption key and a second sensitive-data-specific zone encryption key can be used for translation when an authorization request message will be routed to a second payment processing network 114.

Merchant host server 108 may determine which payment processing network of payment processing networks 112-116 is to receive the authorization request message. At operation 412, the merchant host server 108 may transmit an authorization request message including the translated (re-encrypted) PIN and translated (re-encrypted) sensitive data to the determined payment processing network.

In some embodiments, merchant host server 108 includes "white list" support for allowing specific card ranges defined by the merchant or payment processing network to be excluded from protection. When sensitive data is encrypted at access device 104, a part of the sensitive data may be may be maintained in cleartext for use at access device 104. For example, some or all of the data in the discretionary data field or other field of the track data on the magnetic stripe of payment device 102 may remain unencrypted in the authorization request message. Merchants that use data in the discretionary data field for loyalty programs, fleet programs, or the like may require that this data remain unencrypted for data gathering or other purposes.

In some embodiments, a cardholder name and/or data in the discretionary data field may be made available to the access device prior to encryption. For example, if an application executed by the access device or another merchant device uses this sensitive data (e.g., displaying a cardholder name at a cash register communicatively connected to a PIN pad device), the sensitive data may be exposed to the merchant device prior to encryption.

As discussed above, a chip or magnetic stripe in a payment device may have one or more tracks (typically three tracks, referred to as "track one," "track two," and "track three") that hold data. The data may be formatted in accordance to a standardized structure. FIGS. 5 and 6 are tables showing illustrative specifications for payment device track data. It will be recognized that track data having the structure described in FIGS. 5 and 6 may be stored in association with a payment account on a portable media device or other device used for ecommerce or other card not present transactions.

FIG. 5 is a table showing an illustrative specification for the structure and content of track one of a payment device. Track 1 is encoded with a 7-bit scheme that is based on ASCII. Track 1 fields can include a start sentinel (such as "%"), indicating the position at which the formatted track data begins.

A format code (such as "B," indicating a financial institution) is typically the next character in track 1.

The Primary Account Number (PAN) can be comprised of a six digit Issuer Identification Number (IIN), a variable length (maximum 12 digits) individual account number and a check digit. The end of the data associated with the PAN can be indicated with a separator character, such as a caret (^).

The name field may include a single alpha character (as surname) and the surname separator. The space character may be required to separate the logical elements of the name field other than the surname. The separator terminating the name field may be encoded following the last logical element of the name field. If only the surname is encoded, the Field Separator (FS), such as "^" can follow the surname. In some embodiments, the name field includes a surname, followed by a surname separator (e.g., the "/" character), followed by a first name or initial, followed by a space, followed by a middle name or initial. The name can additionally include a period after the middle name or initial, followed by a title. The name is typically ended with a separator (the character "^"). For example, the name John C. Smith may be encoded as "SMITH/JOHN C".

The expiration field of track one may have the format YYMM, where 'YY' represents the last two digits of the year and 'MM' is the numeric representation of the month.

The service code may be a numeric field with three sub-fields represented by individual digits. Typically, the service code is used to indicate the issuer's acceptance criteria for magnetic stripe transactions and whether a related integrated circuit supporting the equivalent application as identified by the magnetic stripe or embossing is present on the card. Each sub-field of the service code can be identified by its position (position 1, 2 and 3) and can operate independently, allowing judgments on its separate functions.

Issuer discretionary data may follow the service code. The end of the track is indicated by an end sentinel, such as a question mark character ("?"). Following the end sentinel, a longitudinal redundancy check character (LRC) may be included.

FIG. 6 is a table showing an illustrative specification for the structure and content of track two of a payment device. The character codes in track two are based on a 5-bit scheme that is based on ASCII. Track two may contain similar fields to those contained in track one, as described above, but may lack a cardholder name field.

In some embodiments, PIN data may be stored on and read from track three of a payment device.

Encryption with Obfuscation

After encryption is performed on data fields associated with payment device 102, encrypted information may be stored in one or more alternate fields of the authorization request message and obfuscated data may be stored in the original fields of the authorization request message. For example, data may be read from the PAN, cardholder name, and discretionary data fields associated with payment device 102. Obfuscated data may be written to the fields of the authorization request message designated for the PAN, cardholder name, and discretionary data and encrypted versions of the PAN, cardholder name and discretionary data may be written to one or more alternate fields of the authorization request message.

In an illustrative example, for an authorization request message that complies with ISO standards, an alternate field such as ISO field 53 may be defined to receive encrypted data and associated encryption attributes. The new definition of ISO field 53 may conform to the "composite" field type as defined in the ISO standard. The new field 53 may receive encrypted PIN block data and encrypted sensitive data. When zone encryption is applied to an authorization request message, zone encryption may be applied to field 53.

When obfuscated data is written to a PAN field of an authorization request message, some digits of the PAN in the retained PAN field can be maintained and other digits of the PAN can be obfuscated. For example, a subset of digits of the PAN, e.g. digits 7-12 (the "middle six" digits) of the PAN, can be obfuscated, while other digits, such as the first six and last four digits of the PAN, remain as plain text. Obfuscation may be performed, for example, by replacing digits 7-11 of the PAN with the number 9 and replacing digit 12 of the PAN with a number calculated to insure that the last digit of the PAN is a valid check digit. Because the remaining digits of the PAN, such as the first six digits and the final four digits, are not obfuscated, the remaining digits can be used for functions such as routing and receipt determination. In this manner, systems that are designed to handle data contained in the PAN field can function normally although the PAN is protected through obfuscation of the middle six digits. The encrypted PAN stored in an encrypted PAN field can be decrypted, allowing the decrypted (original) PAN to be written into the PAN field.

Format Preserving Encryption

It may be desirable to encrypt data contained in the authorization request message without altering the format of the authorization request message. For example, some systems may not be designed to handle an authorization request message having an added encrypted PAN field. Format preserving encryption may be applied to sensitive data such as PAN, cardholder name and discretionary data from track 1 and track 2 of the track data associated with payment device 102.

A PAN may be encrypted such that the resulting encrypted PAN has the same size as the original PAN. In this manner, the encrypted PAN can be written to the original PAN field of the authorization request message, and no alternate field of the authorization request message is required to receive an encrypted PAN. Some digits of the PAN may remain unencrypted when format preserving encryption is applied to the PAN. For example, the first six and last four digits of the PAN may remain unencrypted to allow for routing and other functions dependent on data contained in these digits.

Format preserving encryption may function differently for PANs that contain valid check digits. An algorithm for determination of valid check digits may be as defined in ISO standards. The check digit, which is typically the final digit of the PAN, may be a digit computed from the other digits in the message that can be used to determine whether all digits of the PAN were correctly received. The check digit may be used to detect transmission errors. In some embodiments, the last digit of digits 7-12 (the "middle six" digits) of the PAN is calculated such that the original last digit of the unencrypted PAN is still a valid check digit for the PAN encrypted with format preserving encryption. When a PAN does not contain a valid check digit, all middle digits may be encrypted with a format preserving encryption algorithm.

Sensitive data may be converted into the a base-10 alphabet prior to encryption. After the format preserving encryption algorithm has been applied, the resulting encrypted characters in base-10 alphabet form may be converted to the original code set and format of the original sensitive data. The converted encryption result may be used to replace the original fields for sensitive data such as PAN, cardholder name, discretionary data, etc. in the authorization request message.

Typically, it will not be apparent from the data in the fields to which format preserving encryption has been applied that the data has been encrypted. A signal may be used in an existing data field of the authorization request message to indicate that a field of an authorization request message contains encrypted data. To implement the signal, a field of the authorization request message that does not contain encrypted data can be overwritten with new contents that are a modified version of the original contents of the field. For example, an expiration date in an expiration date field of the authorization request message can be replaced with an altered expiration date. In one embodiment, the altered expiration date is obtained by adding a number to the expiration date or a portion of the expiration date. For example, a number such as 40 may be added to the year portion of the expiration date. If an expiration date field of an authorization request message contained an expiration date of "01/13," indicating an expiration date of January 2013, the number 40 can be added to year portion 13 and the resulting altered expiration date "01/53" can be written to the expiration date field. If a transaction takes place in 2013, a device reading the expiration date portion of the authorization request message may be able to determine that the expiration date is an altered expiration date because payment devices are typically issued with an expiration date that is under 20 years (e.g., 1-10 years) from the date the card issues. On this basis, it can be determined that an expiration date that is over twenty years past the present date is an altered expiration date.

In some embodiments, the last digit of the PAN may not contain a valid check digit. For example, the last digit of the PAN may not have a check digit as specified by ISO/IEC standard 7812-1. In cases where the last digit of the PAN is not a valid check digit, the number 20 may be added to the month of the expiration data before the altered expiration date is written to the expiration date field of the authorization request message.

In some embodiments, the expiration date field may be missing from the information received by access device 104. For example, a card read or key entry may have errors or otherwise lack the expiration date. The number 40 may be added to the month of the expiration date created in the format preserving encryption process before the altered expiration date is written to the expiration date field of the authorization request message.

Below, an exemplary algorithm for format preserving encryption is described. The format preserving encryption algorithm may operate as a stream cipher that is format preserving. For example, the format preserving encryption may be similar to the Counter Mode (CTR) from the National Institute Standards and Technology (NIST) standard SP800-38A, generalized to modulo-n addition instead of modulo-2 addition.

In the format preserving algorithm, A may be an alphabet with n different characters, where n is a natural number greater than 1. A* may be denoted as the set of strings with elements from A, including the empty string. In this description it is assumed that the alphabet A is the set $\{0, \ldots, n-1\}$. If this is not the case, a translation is needed, based on the number of different characters in the alphabet A. The translation may happen prior to encryption, and again, after decryption, so that encryption and decryption will always work on alphabets of the form $\{0, \ldots, n-1\}$ for some positive integer n, greater than 1.

The format preserving encryption algorithm may use Counter (CTR) mode as defined in SP800-38A with a block cipher CIPH (AES or TDEA) with block size b bits, and encryption key K for CIPH, and a sequence of counter blocks (called counters in SP800-38A) $T_1, T_2, \ldots,$ to produce a sequence of output blocks, one for each counter block. Each output block consists of k base-n digits, where k is a configurable parameter which must be chosen from the interval $\{1, \ldots, \lfloor \log_n 2^b \rfloor\}$. For reasons explained below, each counter block is b-7 bits, rather than b bits as in SP800-38A. The mechanism for how to produce the output blocks is also described below.

To encipher a plaintext P of length L, with $1 \le L$, as many output blocks as necessary (but no more) are generated, so that the total number of base-n digits in the output blocks is at least L, that is, we calculate the unique integers p and r such that $$\frac{L}{k} \le p < \frac{L}{k} + 1$$

and $0 \le r < k$, such that $L = pk - r$, and generate output blocks $G1, \ldots, Gp$. Then each plaintext base-n digit $P[i]$ is added, modulo-n, to the ith base-n digit from the concatenation of the output blocks, $G_1 \| G_2 \| \ldots \| Gp$, to form the ith digit of the ciphertext:

$$C[i]=(P[i]+(G_1\| \ldots \|G_p)[i]) \bmod n.$$

Since k may not divide L, some digits of the last output block, Gp may be ignored. The last r base-n digits of $G_r$ are not used.

To decipher a ciphertext C of length L, with $1 \le L$, as many output blocks as necessary (but no more) are generated, so that the total number of base-n digits in the output blocks exceed L, which is done in the same way as for encryption. Then from each ciphertext base-n digit C[i] is subtracted, modulo-n, the ith base-n digit from the concatenation of the output blocks, $G_1\| \ldots \|G_p$, to form the ith digit of the plaintext:

$$C[i]=(P[i]+(G_1\| \ldots \|G_p)[i]) \bmod n.$$

For format preserving encryption, as for Counter mode itself, the sequence of counter blocks must have the property that each block in the sequence is different from every other block. This condition is not restricted to a single encryption: across all of the messages that are encrypted under a given key K, all counters must be distinct. SP800-38A describes methods for generating counters.

Given a block cipher CIPH with block length b, a key K for CIPH, a b-7 bit counter T, a natural number n>1, which is the base of the plaintext to be enciphered, and an integer k with $0 < k \leq \lfloor \log_n(2^b) \rfloor$, an output block consisting of k base-n digits is produced in the following way:

A 7-bit counter, S, is initialized to 0. Then CIPHK is applied to S||T to produce a block B of b bits. B is interpreted as an integer in the interval $\{0, \ldots, 2^b-1\}$, and if $$B < n^k \left\lfloor \frac{2^b}{n^k} \right\rfloor,$$

then it is accepted, otherwise S is incremented and CIPHK is applied again to S||T, etc., until B is accepted or S equals 127. If S=127, an error is raised, otherwise B is converted to base-n and is the k-digit base-n output block, possibly with leading zeros. Under the assumption that CIPHK is a pseudorandom permutation, the probability in each iteration that B is accepted is at least 0.5, and the probability that an error is raised is at most $2^{-128}$. The pseudocode below describes this algorithm:

```
i = 0;
Input_Block = Si || T ;
max_B = (n^k)*((2^b) div (n^k));
B = CIPH(K, Input_Block);
while ( (AsInteger(B) ≥ max_B) AND (i < 127)) {
    i = i+1;
    Input_Block = Si || T ;
    B = CIPH(K, Input_Block);
};
if (i=127) return ERROR;
Output_Block = Convert(B, k, n);
return Output_Block;
```

Here it is assumed that $S_0, S_1, \ldots, S_{127}$ enumerate the 128 different 7-bit combinations, that "AsInteger" takes a string of b bits $B[1], \ldots, B[b]$ and converts it to the integer $\sum_{i=1}^{b} (B[i] \cdot 2^{b-i})$, and that "Convert" converts B to k base-n digits, with leading zeros if necessary:

```
Convert(B, k, n) {
    M = AsInteger(B);
    for (i=1; i≤k; i++){
        D[i] = M mod n;
        M = M div n;
    };
    return D;
}
```

The maximum value for L, that is, the bit length of the longest plaintext that can be enciphered is $2^{b/2}$.

The upper bound $$n^k \left\lfloor \frac{2^b}{n^k} \right\rfloor$$

for B interpreted as an integer is chosen as the largest possible whole multiple of $n^k$, that makes it possible to extract a k-digit base-n number uniformly from it, assuming the distribution of B is uniform.

Figure 7:
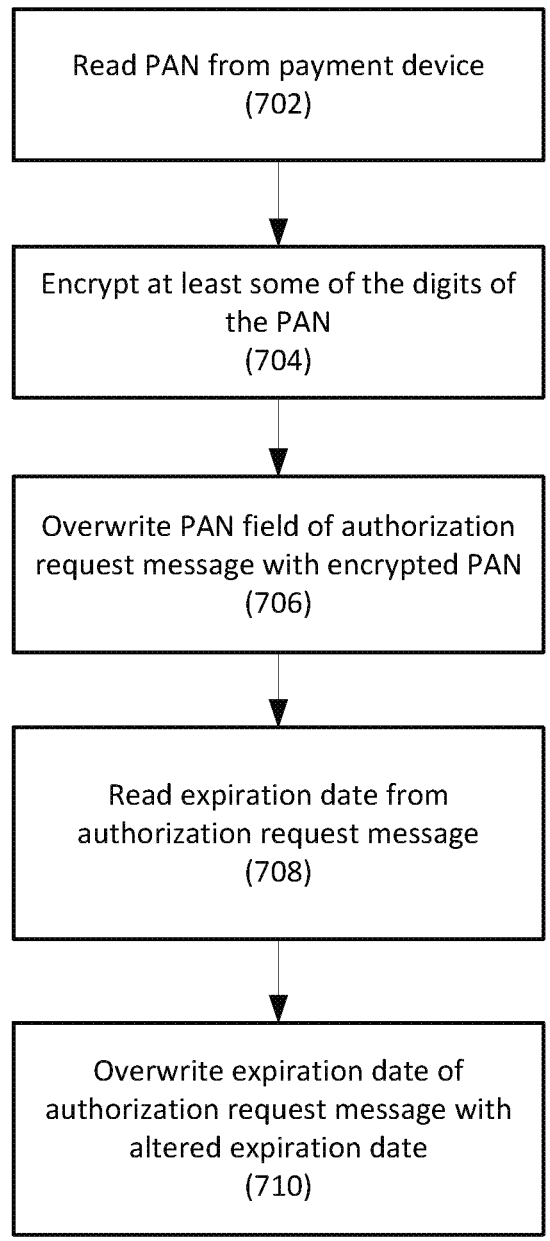
FIG. 7 is a flow chart illustrating an implementation of format preserving encryption according to an embodiment.

FIG. 7 is a flow chart illustrating an implementation of format preserving encryption according to an embodiment. The operations described with reference to FIG. 7 may be performed, for example, by an access device or a host. At operation 702, a PAN is read. The PAN may be read by access device 104 from payment device 102. Alternatively, the PAN may be read from a PAN field of an authorization request message.

At operation 704, at least a part of the PAN is encrypted such that the length of the encrypted PAN is equal to the length of the original PAN. The PAN may be encrypted by access device 104 or merchant host server 108. At operation 706, the encrypted PAN may be written to the PAN field of the authorization request. At operation 708, the expiration date can be read from the expiration date field of the authorization request message (or from the payment device). At operation 710, an altered expiration date can be written to the authorization request message. An altered expiration date may be generated by, for example, adding a number to the year portion of the original expiration date. The number added to the original expiration date may be a number between 5-99, such as a number between 10 and 50, e.g., 40. It will be recognized that alternative algorithms, such as subtraction of a number from the original expiration date, may be used.

Figure 8:
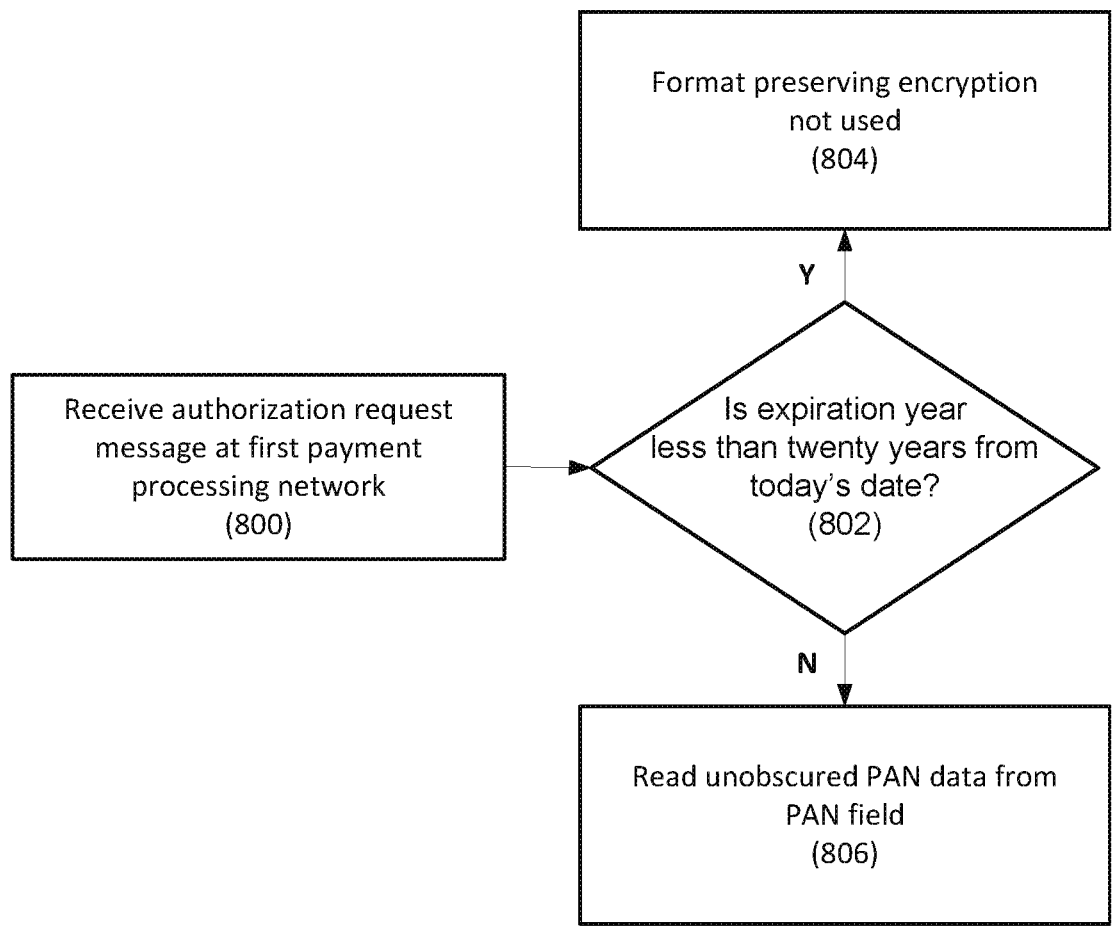
FIG. 8 is a flow chart illustrating interpretation of data to determine whether format preserving encryption has been applied.

FIG. 8 is a flow chart illustrating interpretation of data to determine whether format preserving encryption has been applied. The operations described with reference to FIG. 8 may be performed, for example, by merchant host server 108, a payment processing network 112-116, an issuer, an acquirer, etc. At operation 800, an authorization request message is received. For example, the authorization request message may be received by merchant host server 108 or a payment processing network. At decision diamond 802, it may be determined whether the year portion of an expiration date read from the expiration date field of an authorization request message is less than a particular number of years from the current date, e.g., 20 years from the current date. If the expiration year is less than 20 years from the current date, no signal for format preserving encryption is present in the authorization request message, as indicated at 804. If the expiration date is more than 20 years from the current date, unencrypted data of the PAN can be read from the PAN field, as indicated at operation 806. The unencrypted PAN data may be used for routing (e.g., by the merchant host server 108), fraud detection, authorization determination, or other purposes.

Computer System

Figure 9:
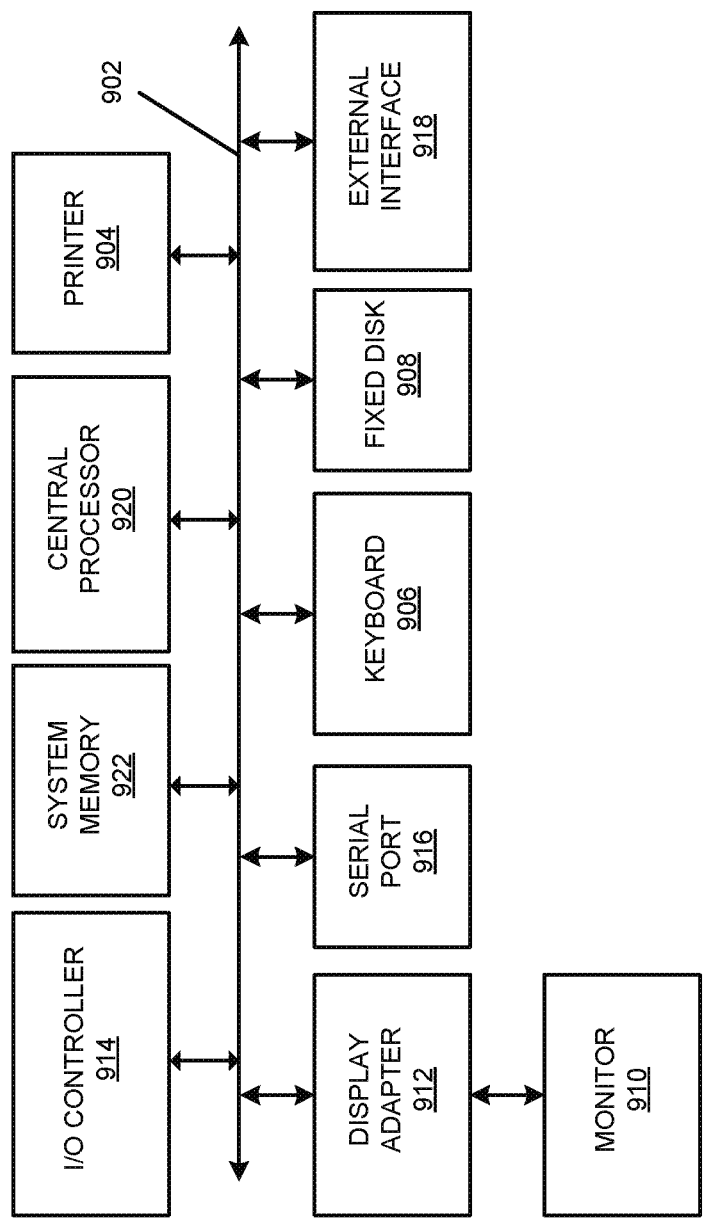
FIG. 9 depicts an illustrative high level block diagram of a computer system.

FIG. 9 is an illustrative high level block diagram of a computer system that may be used to implement any of the entities or components described above (e.g., the access device, host, payment processing network, acquirer processor, etc.). The subsystems shown in FIG. 9 are interconnected via a system bus 902. Additional subsystems such as a printer 904, keyboard 906, fixed disk 908, and monitor 910, are coupled to display adapter 912. Peripherals and input/output (I/O) devices, which couple to I/O controller 914, can be connected to the computer system by any number of means known in the art, such as serial port 916. For example, serial port 916 or external interface 918 can be used to connect the computer apparatus to a wide area network such as the Internet, a mouse input device, or a scanner. The interconnection via system bus 902 allows the central processor 920 to communicate with each subsystem and to control the execution of instructions from system memory 922 or the fixed disk 908, as well as the exchange of information between subsystems. The system memory 922 and/or the fixed disk 908 may embody a computer readable medium.

As described, the inventive service may involve implementing one or more functions, processes, operations or method steps. In some embodiments, the functions, processes, operations or method steps may be implemented as a result of the execution of a set of instructions or software code by a suitably programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computer-implemented method comprising:
   receiving, by a payment processing network computer from a host server, an authorization request message for a transaction, wherein the authorization request message includes an encrypted personal identification number (PIN) encrypted using a first zone encryption key and encrypted sensitive data encrypted using a second zone encryption key, wherein the first zone encryption key and the second zone encryption key are associated with the payment processing network computer, unique from each other, and both derived from an initial key derived from a base derivation key that is associated with a key serial number;
   decrypting, by the payment processing network computer, the encrypted PIN using a first zone decryption key;
   decrypting, by the payment processing network computer, the encrypted sensitive data using a second zone decryption key;
   verifying, by the payment processing network computer, the decrypted sensitive data and the decrypted PIN; and
   based on the verified decrypted sensitive data and PIN, performing authorization processing for the transaction, including transmitting an authorization response message to the host server, the authorization response message indicating whether the transaction is approved,
   wherein the first zone encryption key and the second zone encryption key are selected from a set of zone encryption keys based on a determination that the authorization request message is to be routed to the payment processing network computer, of a plurality of potential payment processing network computers, based on the decrypted sensitive data, and
   wherein a third zone encryption key and a fourth zone encryption key are associated with a second payment processing network computer and used for encryption when routing a second authorization request message to the second payment processing network computer, and wherein the second payment processing network computer uses a third zone decryption key and a fourth zone decryption key to decrypt and validate a second sensitive data and a second PIN, respectively, for a second transaction, wherein the host server:
   received the sensitive data and the PIN encrypted in a first format, wherein the PIN and the sensitive data are encrypted using Triple DES Encryption Algorithm (TDEA),
   derived the initial key from the base derivation key,
   generated a first derived decryption key and a second derived decryption key from the initial key according to a derived unique key per transaction (DUKPT) key management scheme,
   decrypted the PIN using the first derived decryption key, and
   decrypted the sensitive data using the second derived decryption key,
   prior to re-encrypting the PIN using the first zone encryption key and re-encrypting the sensitive data using the second zone encryption key.

2. The method of claim 1, wherein the sensitive data includes a primary account number (PAN) identifying an account.

3. The method of claim 2, wherein the sensitive data further includes at least one of a cardholder name, a cardholder address, and discretionary data, and wherein a subset of discretionary data remains unencrypted when discretionary data is included in encrypted sensitive data.

4. The method of claim 2, wherein performing authorization processing for the transaction further comprises:
   determining, by the payment processing network computer, whether the transaction is authorized; and
   generating, by the payment processing network computer, the authorization response message indicating whether the transaction is authorized.

5. The method of claim 1, wherein an encrypted primary account number (PAN) is written to a PAN field of the authorization request message, wherein the encrypted PAN has a same format as the PAN.

6. The method of claim 1, further comprising:
performing, by the payment processing network computer, a clearing and settlement process for the transaction.

7. A payment processing network computer comprising:
a processor; and
a non-transitory computer-readable medium coupled to the processor and comprising instructions executable by the processor to perform steps comprising:
receiving an authorization request message for a transaction from a host server, wherein the authorization request message includes an encrypted personal identification number (PIN) encrypted using a first zone encryption key and encrypted sensitive data encrypted using a second zone encryption key, wherein the first zone encryption key and the second zone encryption key are associated with the payment processing network computer, unique from each other, and both derived from an initial key derived from a base derivation key;
decrypting the encrypted PIN using a first zone decryption key;
decrypting the encrypted sensitive data using a second zone decryption key;
verifying the decrypted sensitive data and the decrypted PIN; and
based on the verified decrypted sensitive data and PIN, performing authorization processing for the transaction, including transmitting an authorization response message to the host server, the authorization response message indicating whether the transaction is approved,
wherein the first zone encryption key and the second zone encryption key are selected from a set of zone encryption keys based on a determination that the authorization request message is to be routed to the payment processing network computer, of a plurality of potential payment processing network computers, based on the decrypted sensitive data, and
wherein a third zone encryption key and a fourth zone encryption key are associated with a second payment processing network computer and used for encryption when routing a second authorization request message to the second payment processing network computer, and wherein the second payment processing network computer uses a third zone decryption key and a fourth zone decryption key to decrypt and validate a second sensitive data and a second PIN, respectively, for a second transaction, wherein the host server:
received the sensitive data and the PIN encrypted in a first format, wherein the PIN and the sensitive data are encrypted using Triple DES Encryption Algorithm (TDEA),
derived the initial key from the base derivation key,
generated a first derived decryption key and a second derived decryption key from the initial key according to a derived unique key per transaction (DUKPT) key management scheme,
decrypted the PIN using the first derived decryption key, and
decrypted the sensitive data using the second derived decryption key,
prior to re-encrypting the PIN using the first zone encryption key and re-encrypting the sensitive data using the second zone encryption key.

8. The payment processing network computer of claim 7, wherein the sensitive data includes a primary account number (PAN) identifying an account.

9. The payment processing network computer of claim 8, wherein the sensitive data further includes at least one of a cardholder name, a cardholder address, and discretionary data, and wherein a subset of discretionary data remains unencrypted when discretionary data is included in encrypted sensitive data.

10. The payment processing network computer of claim 7, wherein performing authorization processing for the transaction further comprises:
determining whether the transaction is authorized.

11. The payment processing network computer of claim 10, wherein performing authorization processing for the transaction further comprises:
generating the authorization response message based on determining whether the transaction is authorized.

12. The payment processing network computer of claim 7, wherein an encrypted primary account number (PAN) is written to a PAN field of the authorization request message, wherein the encrypted PAN has a same format as the PAN.

* * * * *